US009951676B2

(12) United States Patent
Seo

(10) Patent No.: US 9,951,676 B2
(45) Date of Patent: Apr. 24, 2018

(54) DIAGNOSTIC APPARATUS AND METHOD FOR COOLANT CONTROL VALVE

(71) Applicant: HYUNDAI MOTOR COMPANY, Seoul (KR)

(72) Inventor: Yoo Jin Seo, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/259,838

(22) Filed: Sep. 8, 2016

(65) Prior Publication Data

US 2017/0362993 A1    Dec. 21, 2017

(30) Foreign Application Priority Data

Jun. 20, 2016  (KR) .......................... 10-2016-0076533

(51) Int. Cl.
*F01P 7/16* (2006.01)
*F16K 11/085* (2006.01)
(Continued)

(52) U.S. Cl.
CPC ................. *F01P 7/16* (2013.01); *F01P 11/14* (2013.01); *F16K 11/085* (2013.01); *F16K 31/041* (2013.01); *F16K 37/0083* (2013.01); *F01P 2007/146* (2013.01); *F01P 2031/00* (2013.01); *F01P 2031/34* (2013.01); *F01P 2060/04* (2013.01); *F01P 2060/08* (2013.01)

(58) Field of Classification Search
CPC . F01P 7/16; F01P 7/164; F16K 11/085; F16K 31/041; F16K 31/0083; Y10T 137/86566
See application file for complete search history.

(56) References Cited

U.S. PATENT DOCUMENTS 6,679,202 B2 *   1/2004   Nakano ..................... F01P 5/14
                                                        123/41.1
7,182,048 B2 *   2/2007   Nakano ................... F01P 7/164
                                                        123/41.1
(Continued)

FOREIGN PATENT DOCUMENTS

EP          2587017 A1    5/2013
EP          3130777 A1    2/2017
(Continued)

OTHER PUBLICATIONS

Extended European Search Report issued in European Patent Application No. 16189651.9, dated Oct. 20, 2017.

*Primary Examiner* — Craig Schneider
*Assistant Examiner* — Kevin Barss
(74) *Attorney, Agent, or Firm* — McDermott Will & Emery LLP

(57) ABSTRACT

A diagnostic apparatus for a coolant control valve including a housing having a plurality of ports, a valve member provided to be rotatable in the housing, and a driving device rotating the valve member between two end positions, the diagnostic apparatus including at least one position sensor provided on an external surface of the housing for sensing a position of the valve member, a determination device for determining whether or not the valve member is stuck using the position of the valve member sensed by the position sensor and a controller for controlling the driving device.

13 Claims, 8 Drawing Sheets

(51) Int. Cl.
  *F16K 31/04* (2006.01)
  *F16K 37/00* (2006.01)
  *F01P 7/14* (2006.01)
  *F01P 11/14* (2006.01)

(56) References Cited

U.S. PATENT DOCUMENTS

| | | | |
|---|---|---|---|
| 7,207,297 B2 * | 4/2007 | Hayami | F01P 7/164 |
| | | | 123/41.1 |
| 7,322,345 B2 | 1/2008 | Saito et al. | |
| 7,926,335 B2 * | 4/2011 | Wegener | F02B 37/16 |
| | | | 73/114.77 |
| 2002/0179165 A1 | 12/2002 | Hu et al. | |
| 2005/0092949 A1 * | 5/2005 | Wilhelm | F02D 35/0007 |
| | | | 251/129.04 |
| 2014/0083376 A1 | 3/2014 | Bohm | |
| 2016/0047292 A1 | 2/2016 | Gonze et al. | |
| 2017/0016381 A1 | 1/2017 | Yumisashi et al. | |
| 2017/0022881 A1 | 1/2017 | Matsumoto et al. | |
| 2017/0159548 A1 | 6/2017 | Richter et al. | |

FOREIGN PATENT DOCUMENTS

| | | |
|---|---|---|
| JP | 2001-012245 A | 1/2001 |
| JP | 2016-008572 A | 1/2016 |
| KR | 10-1558394 B1 | 10/2015 |
| KR | 10-1592428 B1 | 2/2016 |
| WO | 2015/155964 A1 | 10/2015 |
| WO | 2016/026903 A1 | 2/2016 |

* cited by examiner

DIAGNOSTIC APPARATUS AND METHOD FOR COOLANT CONTROL VALVE

CROSS-REFERENCE TO RELATED APPLICATION

This application claims the benefit of priority to Korean Patent Application No. 10-2016-0076533, filed on Jun. 20, 2016 with the Korean Intellectual Property Office, the disclosure of which is incorporated herein in its entirety by reference.

TECHNICAL FIELD

The present disclosure relates to a diagnostic apparatus and method for a coolant control valve and, more particularly, to a diagnostic apparatus and method for a coolant control valve that may diagnose a failure of the coolant control valve, such as a stuck valve, to warn a vehicle operator of the failure.

BACKGROUND

A coolant control valve may be applied to an engine system of a vehicle to control a flow amount and/or direction of a coolant for the purposes of improving fuel efficiency and output, while reducing emissions.

The coolant control valve may adjust the temperature of a coolant by circulating the coolant through a circulation flow path between a cooling jacket of the engine and a radiator, and may block the flow of the coolant toward the radiator during a cold start of the vehicle to thereby warm-up the engine. In addition, the coolant control valve may also be used for various warm-up applications by allowing the coolant to flow into an oil warmer, an exhaust-gas recirculation (EGR), a heater and the like.

Meanwhile, the coolant control valve may be provided with a fail-safety type thermostat. The thermostat may force the coolant to flow toward the radiator when the coolant control valve is stuck due to errors in a sensor signal and a control circuit, abnormal control of a driving motor and the like, thereby preventing overheating of the coolant.

The thermostat may contain a wax in the interior thereof. When the temperature of the coolant is increased to be higher than or equal to a predetermined value, the coolant control valve may forcibly be driven to force the coolant to flow toward the radiator.

However, the wax of the thermostat may be repeatedly liquefied and solidified according to changes in the temperature of the coolant, which may lead to a frequent failure of the thermostat itself. Thus, the entirety of the coolant control valve may need to be replaced, which may increase maintenance costs.

In a case in which the temperature of the coolant is increased in a section of the cold engine start, the thermostat needs to operate only when the flow path to the radiator is opened. Thus, the cost-effectiveness of the thermostat may be low.

SUMMARY

The present disclosure has been made to solve the above-mentioned problems occurring in the prior art while advantages achieved by the prior art are maintained intact.

An aspect of the present disclosure provides a diagnostic apparatus and method for a coolant control valve that may diagnose a failure of the coolant control valve, such as a valve stuck, using control logic, to forewarn a vehicle operator of the failure and secure driving stability.

According to an aspect of the present disclosure, a diagnostic apparatus for a coolant control valve including a housing having a plurality of ports, a valve member provided to be rotatable in the housing, and a driving device rotating the valve member between two end positions, may include: at least one position sensor provided on an external surface of the housing and sensing a position of the valve member; a determination device determining whether or not the valve member is stuck, using the position of the valve member sensed by the position sensor; and a controller controlling the driving device.

The determination device may compare the position of the valve member sensed by the position sensor with the end positions to determine whether or not the valve member is stuck.

The diagnostic apparatus may further include a current detector monitoring a current level of the driving device in real time, and the determination device may determine whether or not the valve member is stuck, using the current level monitored in real time by the current detector.

The controller may be connected to a warning device warning that the valve member is stuck.

The diagnostic apparatus may further include an emergency switch device allowing a coolant to flow toward a radiator when the valve member is stuck.

The housing of the coolant control valve may have an inflow port connected to a cooling jacket of an engine through an inflow passage, a first outflow port connected to the radiator through a first outflow passage, and a second outflow port connected to a heater through a second outflow passage, and the emergency switch device may include a bypass passage connecting the inflow passage to the first outflow passage, and a switching valve provided in the bypass passage to allow the coolant to flow toward the radiator.

The housing of the coolant control valve may have an inflow port connected to a cooling jacket of an engine through an inflow passage, a first outflow port connected to the radiator through a first outflow passage, and a second outflow port connected to a heater through a second outflow passage, and the emergency switch device may include a first bypass passage connecting the inflow passage to the first outflow passage, a second bypass passage connecting the inflow passage to the second outflow passage, and a switching valve that is switched to allow the coolant to flow through any one of the first bypass passage and the second bypass passage.

According to another aspect of the present disclosure, a diagnostic method for a coolant control valve including a housing having an inflow port connected to a cooling jacket of an engine and a first outflow port connected to a radiator, a valve member provided to be rotatable in the housing, and a driving device rotating the valve member between two end positions, may include: rotating the valve member to fully open the first outflow port when the engine is off; moving the valve member to at least one of the end positions when the engine is on, to perform a determination operation that determines whether or not the valve member is stuck; and moving the valve member to a limp home position when it is determined that the valve member is stuck, to operate a limp home mode and generate a warning signal.

The diagnostic method may further include performing a stuck release operation of the valve member unless the valve member is moved to the limp home position.

The diagnostic method may further include: determining whether or not the valve member is stuck again when the valve member is released through the stuck release operation; and generating a warning signal again unless the valve member is released through the stuck release operation.

The diagnostic method may further include normally controlling the coolant control valve after moving the valve member to a position in which the first outflow port is closed when it is determined that the valve member is in a normal state.

The determination operation may include: a first determination operation including rotating the valve member toward a first end position, and determining whether or not a position of the valve member sensed by a position sensor is within an error range of the first end position; and a second determination operation including rotating the valve member toward a second end position when it is determined in the first determination operation that the valve member is stuck, and determining whether or not a position of the valve member sensed by a position sensor is within an error range of the second end position.

The first determination operation may further include determining whether or not the valve member is stuck on the basis of a current level monitored in real time in the middle of moving the valve member to the first end position.

The second determination operation may further include determining whether or not the valve member is stuck on the basis of a current level monitored in real time in the middle of moving the valve member to the second end position.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
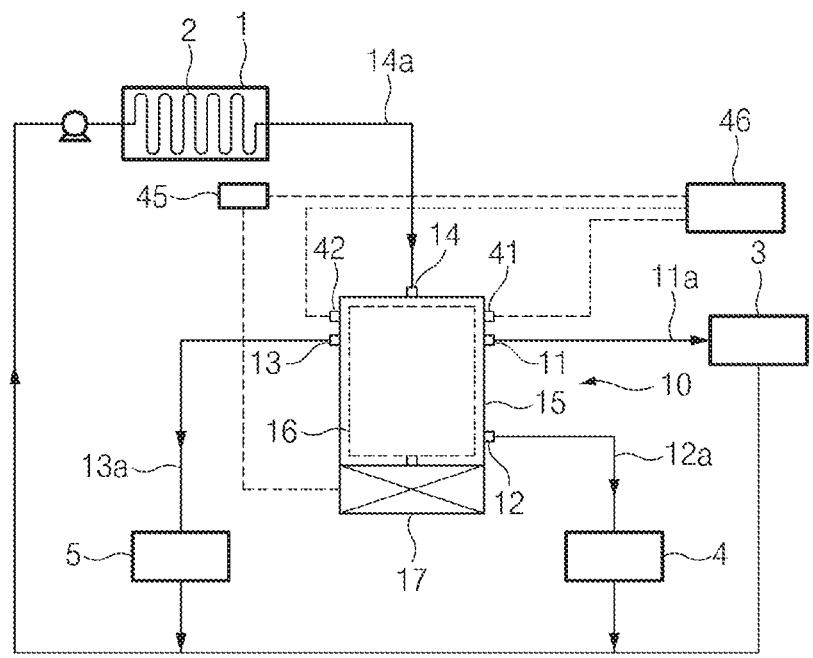
FIG. 1 illustrates a schematic diagram of an engine system including a coolant control valve, according to exemplary embodiments of the present disclosure.

Hereinafter, exemplary embodiments of the present disclosure will be described in detail with reference to the accompanying drawings. For reference, the dimensions of elements, thicknesses of lines, and the like, illustrated in the drawings referred to in the description of exemplary embodiments of the present disclosure may be exaggerated for convenience of understanding. In addition, terms used for describing the presently disclosed concepts have been defined in consideration of the functions of elements, and may be altered in accordance with the intention of a user or an operator, in view of practice or the like. Therefore, the terms should be defined on the basis of the entirety of this specification.

Referring to FIG. 1, an engine system may include an engine 1 having a cooling jacket 2, and a coolant control valve 10 controlling the flow amount and direction of a coolant that has passed through the cooling jacket 2 of the engine 1 to selectively circulate a radiator 3, a heater 4, an oil warmer 5 and the like.

The cooling jacket 2 may be disposed in a cylinder block and/or a cylinder head of the engine 1. As the coolant passes through the cooling jacket 2, a temperature of the engine 1 may appropriately be controlled.

Figure 2:
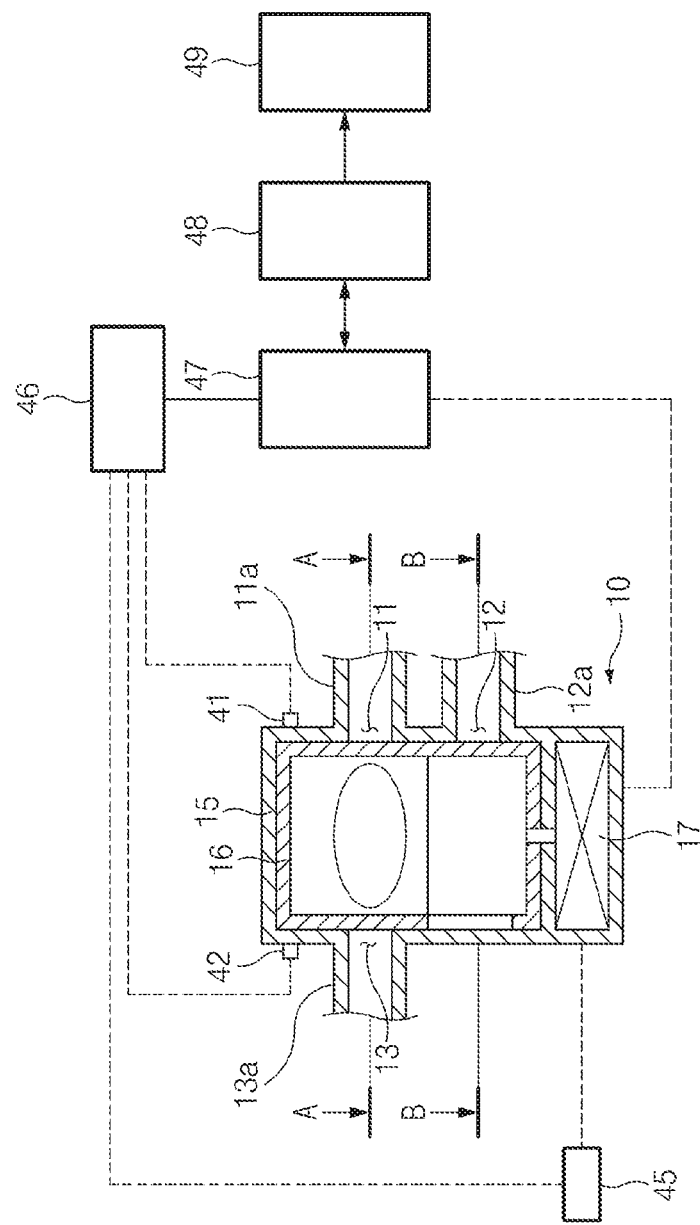
FIG. 2 illustrates a configuration of a diagnostic apparatus for a coolant control valve, according to exemplary embodiments of the present disclosure.
Figure 3:
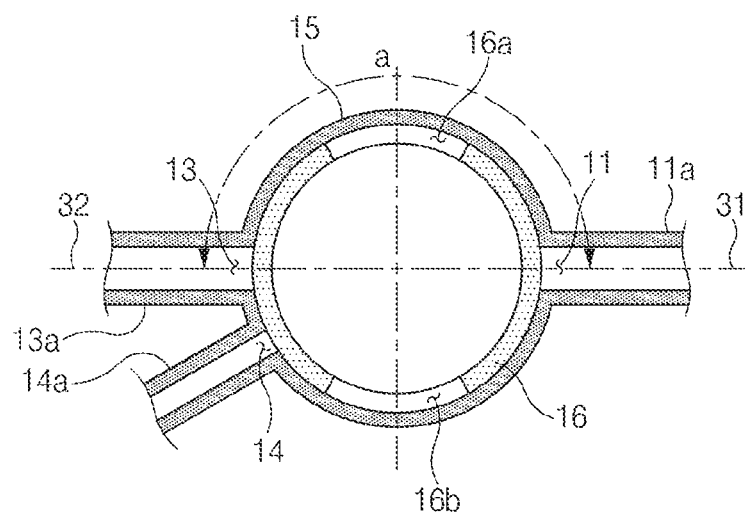
FIG. 3 illustrates a cross-sectional view, taken along line A-A of FIG. 2.
Figure 4:
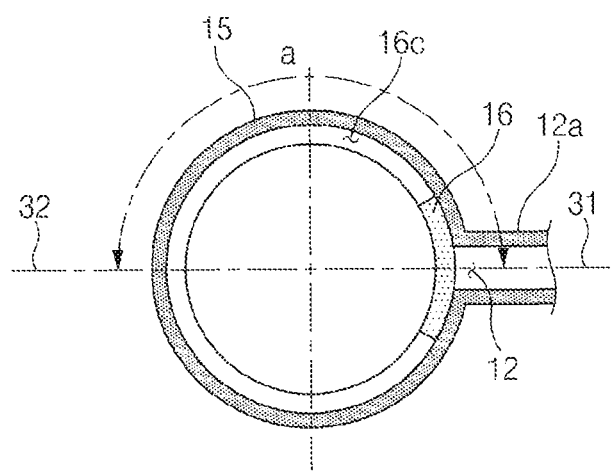
FIG. 4 illustrates a cross-sectional view, taken along line B-B of FIG. 2.

As illustrated in FIGS. 2 to 4, the coolant control valve 10 may include a housing 15, a valve member 16 provided to be rotatable in the housing 15 and a driving device 17 for rotating the valve member 16.

The housing 15 may have an inflow port 14 connected to the cooling jacket 2 of the engine 1 through an inflow passage 14a, a first outflow port 11 connected to the radiator 3 through a first outflow passage 11a, a second outflow port 12 connected to the heater 4 through a second outflow passage 12a, and a third outflow port 13 connected to the oil warmer 5 through a third outflow passage 13a.

A throttle valve body as well as the heater 4 may be provided on the second outflow passage 12a, and an exhaust gas recirculation (EGR) device, as well as the oil warmer 5, may be provided on the third outflow passage 13a.

The valve member 16 may have a cylinder structure of which the interior is hollow. The valve member 16 may have a plurality of openings 16a, 16b and 16c.

Through the rotations of the valve member 16, the plurality of openings 16a, 16b and 16c may selectively contact the inflow port 14, the first outflow port 11, the second outflow port 12, the third outflow port 13 of the housing 15 such that the opening degrees of respective ports 11, 12, 13 and 14 may be adjusted and the ports 11, 12, 13 and 14 may be selectively opened and closed. Accordingly, the flow amount and direction of the coolant with respect to the cooling jacket 2 of the engine 1, the radiator 3, the heater 4 and the oil warmer 5 may be controlled.

As illustrated in FIG. 3, first and second openings 16a and 16b of the valve member 16 may selectively contact the inflow port 14, the first outflow port 11 and the third outflow port 13 of the housing 15 such that the opening degree of the inflow port 14, the opening degree of the first outflow port 11, and the opening degree of the third outflow port 13 may be appropriately adjusted to control the flow amount and direction of the coolant.

As illustrated in FIG. 4, a third opening 16c of the valve member 16 may selectively contact the second outflow port 12 of the housing 15 such that the opening degree of the second outflow port 12 may be appropriately adjusted to control the flow amount and direction of the coolant.

Figure 7:
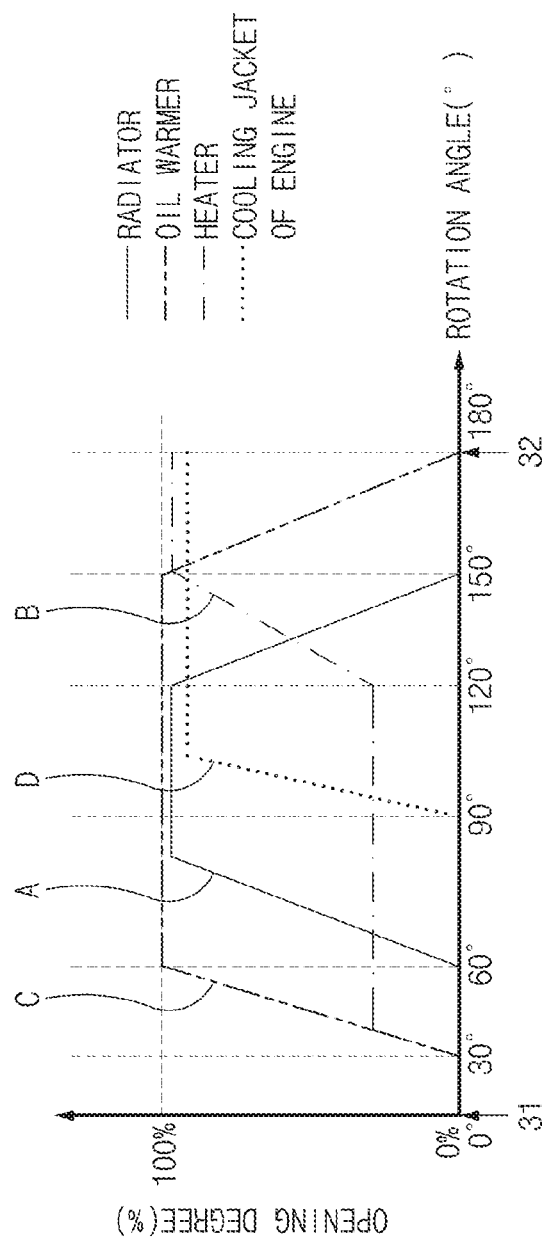
FIG. 7 illustrates opening degrees of respective ports according to rotation angles of a valve member of the coolant control valve of FIG. 1.

FIG. 7 illustrates opening degrees of the inflow port 14, the first outflow port 11, the second outflow port 12 and the third outflow port 13 of the coolant control valve 10 which may be adjusted according to rotation angles of the valve member 16. In FIG. 7, line A indicates the opening degree of the first outflow port 11 according to a change in the rotation angle of the valve member 16, line B indicates the opening degree of the second outflow port 12 according to a change in the rotation angle of the valve member 16, line C indicates the opening degree of the third outflow port 13 according to a change in the rotation angle of the valve member 16 and line D indicates the opening degree of the inflow port 14 according to a change in the rotation angle of the valve member 16.

Referring to FIGS. 3 and 4, the valve member 16 may rotate between two end positions 31 and 32, and a rotation range "a" of the valve member 16 may be limited by the two end positions 31 and 32. For example, when the rotation range "a" of the valve member 16 is set to 180° as illustrated in FIG. 7, the first end position 31 corresponding to a low end position may be 0° and the second end position 32 corresponding to a high end position may be 180°. In addition, all of the plurality of ports 11, 12, 13, and 14 may be closed in the first end position 31 and the second end position 32 as illustrated in FIG. 7.

The driving device 17 may include a driving motor and an electric gear train for transmitting power of the driving motor to a rotation shaft of the valve member 16.

According to exemplary embodiments of the present disclosure, a diagnostic apparatus for the coolant control valve includes one or more position sensors 41 and 42 for sensing a position of the valve member 16, a determination device 46 for determining whether or not the valve member 16 is stuck on the basis of the position of the valve member 16 sensed by the position sensors 41 and 42, and a controller 47 for controlling the driving device 17.

As illustrated in FIGS. 1 and 2, the position sensors 41 and 42 may be disposed on an external surface of the housing 15 of the coolant control valve 10 to sense the position of the valve member 16.

According to exemplary embodiments, the position sensors 41 and 42 include a first position sensor 41 disposed in a position corresponding to the first end position 31 and a second position sensor 42 disposed in a position corresponding to the second end position 32.

The determination device 46 may determine whether or not the valve member 16 is stuck by comparing the position of the valve member 16 sensed by the position sensors 41 and 42 with the first end position 31 and/or the second end position 32.

In detail, in the determination process of the determination device 46 using the position sensors 41 and 42, when the position of the valve member 16 sensed by the position sensors 41 and 42 is within an error range of the first end position 31 and/or the second end position 32, the determination device 46 may determine that the valve member 16 is not stuck. On the other hand, when the position of the valve member 16 sensed by the position sensors 41 and 42 is out of an error range of the first end position 31 and/or the second end position 32, the determination device 46 may determine that the valve member 16 is stuck due to errors in sensor signals and a control circuit, abnormal control of the driving motor, and the like. Here, the error range of each of the end positions 31 and 32 may be set to a value in consideration of a manufacturing tolerance, or another consideration.

The controller 47 may be electrically connected to the driving device 17 to control the driving device 17. The controller 47 may be electrically connected to an electronic control unit (ECU) 48 of a vehicle, and the ECU 48 of the vehicle may be connected to a cluster 49 of the vehicle.

Meanwhile, the controller 47 may be separately or integrally provided with the ECU 48 of the vehicle.

Meanwhile, immediately after a cold start of the engine, the controller 47 may control the driving motor of the driving device 17 to forcibly rotate the valve member 16, thereby moving the valve member 16 to at least one of the end positions 31 and 32.

In addition, according to exemplary embodiments, the diagnostic apparatus may further include a current detector 45 electrically connected to the driving device 17 of the coolant control valve 10. The current detector 45 may sense a current level applied to the driving motor of the driving device 17 in real time. The current level sensed by the current detector 45 may be transmitted to the controller 47, and thus, the controller 47 may monitor the current level in real time.

Meanwhile, the coolant control valve 10 may have a stopper structure (not shown) of various forms for stopping the valve member 16 in each of the end positions 31 and 32. When the valve member 16 is stopped in each of the end positions 31 and 32 by the stopper structure, a load may be applied to the driving motor of the driving device 17. Thus, when the current level sensed in real time by the current detector 45 is monitored by the controller 47, the monitored current level may be increased.

In addition, the determination device 46 may determine whether or not the valve member 16 is stuck on the basis of the current level monitored in real time by the current detector 45 and the controller 47.

In detail, in the determination process of the determination device 46 using the current detector 45, when the load is applied to the driving motor of the driving device 17 in the middle of rotating the valve member 16 toward any one of the end positions 31 and 32, that is, before the valve member 16 reaches the end positions 31 and 32 (in other words, when the load is applied due to other factors than the stopper structure), the determination device 46 may recognize that the current level monitored in real time is increased. When the determination device 46 recognizes that the current level monitored in real time by the current detector 45 and the controller 47 is increased, the determination device 46 may determine that the valve member 16 is stuck. In addition, when the determination device 46 recognizes that the current level monitored in real time by the current detector 45 and the controller 47 is not increased, the determination device 46 may determine that the valve member 16 is in a normal state.

When it is determined by the determination device 46 whether or not the valve member 16 is stuck, the controller 47 may control the driving device 17.

Figure 5:
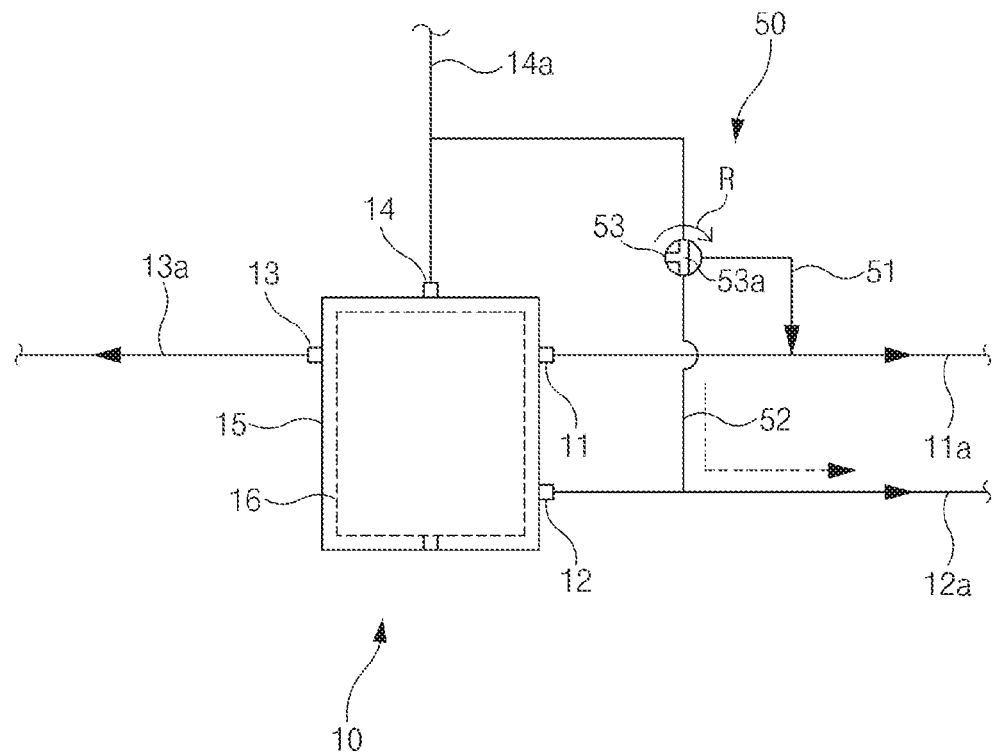
FIG. 5 illustrates a structure in which an emergency switch device is provided in a diagnostic apparatus for a coolant control valve, according to exemplary embodiments of the present disclosure, before the emergency switch device performs a switching operation.
Figure 6:
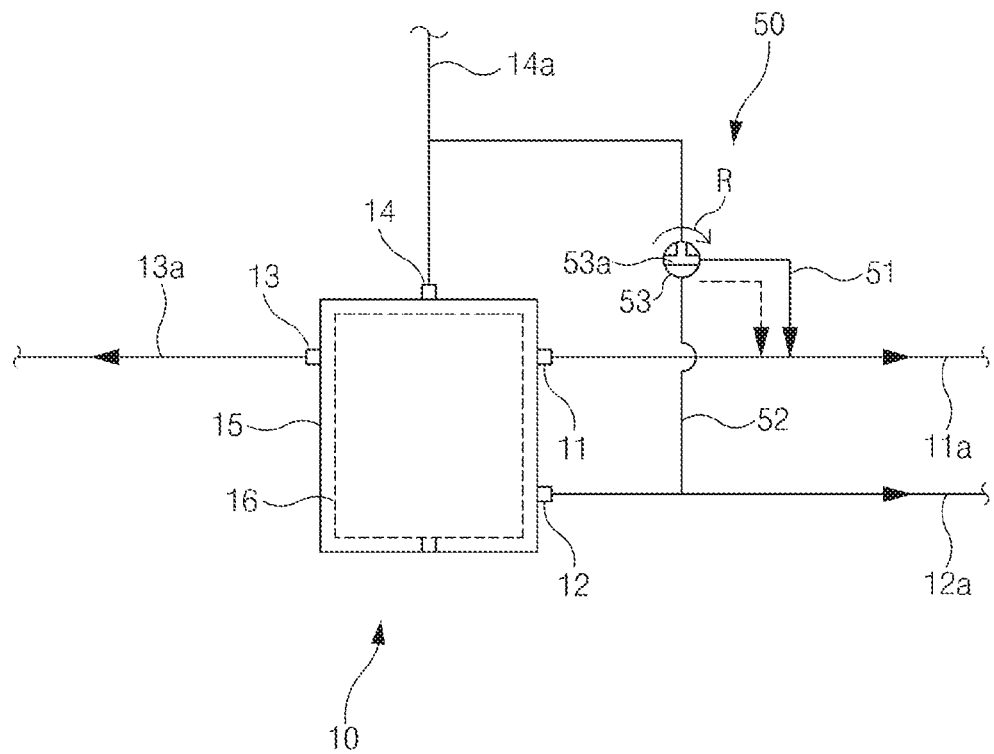
FIG. 6 illustrates a structure in which an emergency switch device is provided in a diagnostic apparatus for a coolant control valve, according to exemplary embodiments of the present disclosure, after the emergency switch device performs a switching operation.

According to exemplary embodiments of the present disclosure, as illustrated in FIGS. 5 and 6, the diagnostic apparatus further may include an emergency switch device 50 for allowing the coolant to flow toward the radiator 3 when the valve member 16 is stuck.

According to exemplary embodiments, the emergency switch device 50 includes a first bypass passage 51 connecting the inflow passage 14a to the first outflow passage 11a, a second bypass passage 52 for connecting the inflow passage 14a to the second outflow passage 12a, and a switching valve 53 for performing a switching operation to allow the coolant to flow to any one of the first bypass passage 51 and the second bypass passage 52.

The switching valve 53 may have a T-shaped flow path 53a in the interior thereof. Through the switching operation of the switching valve 53, the coolant may flow to any one of the first bypass passage 51 and the second bypass passage 52.

When the determination device 46 determines that the valve member 16 is not stuck, the inflow passage 14*a* may communicate with the second bypass passage 52 by the switching valve 53 of the emergency switch device 50 as illustrated in FIG. 5, and thus, the coolant may flow toward the heater 4 through the second bypass passage 52.

When the determination device 46 determines that the valve member 16 is stuck, the inflow passage 14*a* may communicate with the first bypass passage 51 through the switching operation (rotation in an R-direction of an arrow in FIG. 5) of the switching valve 53 of the emergency switch device 50 as illustrated in FIG. 6. Thus, the coolant may flow toward the radiator 3 through the first bypass passage 51. Accordingly, overheating of the coolant may be prevented.

The switching valve 53 of the emergency switch device 50 may be an electronic valve controlled by the controller 47 to perform the switching operation. Alternatively, the switching valve 53 of the emergency switch device 50 may be a manual valve operated manually by an operator to perform the switching operation.

According to other exemplary embodiments, the emergency switch device 50 may have a structure in which the second bypass passage 52 is omitted.

Figure 8:
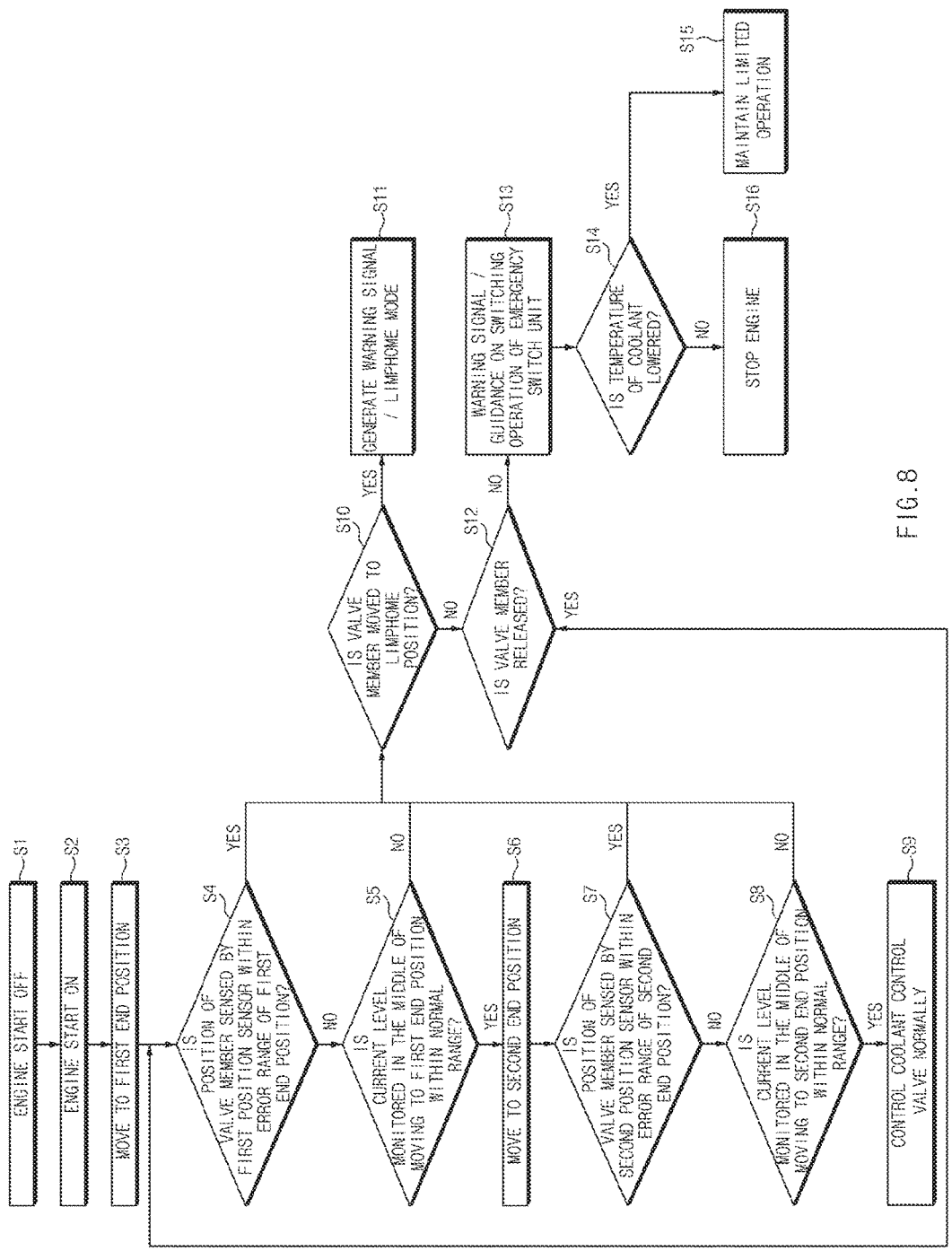
FIG. 8 illustrates a flowchart of a diagnostic method for a coolant control valve, according to exemplary embodiments of the present disclosure.

FIG. 8 illustrates a flowchart of a diagnostic method for a coolant control valve, according to exemplary embodiments of the present disclosure.

Referring to FIG. 8, in the diagnostic method for a coolant control valve according to the exemplary embodiments of the present disclosure, when the engine 1 is turned off, the valve member 16 may be rotated by the controller 47 to fully open the first outflow port 11 of the housing 15 in operation S1. For example, when the valve member 16 is positioned at approximately 90°-120° in FIG. 7, the first outflow port 11 may be fully opened. By fully opening the first outflow port 11 of the housing 15 when the engine is off, the engine system may be normally operated even if the valve member 16 is stuck when the engine is on.

Next, the engine 1 may be turned on in operation S2, and the valve member 16 may be rotated by the controller 47 and the driving device 17 in at least one direction to be moved to the first end position 31 in operation S3. Here, the controller 47 may control the driving device 17 to move the valve member 16 to the first end position 31. For example, the first end position 31 may be 0° in FIG. 7.

When the valve member 16 is stopped in a particular position in the middle of moving toward the first end position 31, the determination device 46 may compare a position of the valve member 16 sensed by the first position sensor 41 with the first end position 31 to determine whether or not the valve member 16 is stuck in operation S4.

In detail, in the determination as to whether or not the valve member 16 is stuck, which is made using the first position sensor 41, when the position of the valve member 16 sensed by the first position sensor 41 is within an error range of the first end position 31, the determination device 46 may determine that the valve member 16 is in a normal state (as in, the valve member 16 is not stuck). On the other hand, when the position of the valve member 16 sensed by the first position sensor 41 is outside of the error range of the first end position 31, the determination device 46 may determine that the valve member 16 is stuck due to errors in sensor signals and the control circuit, abnormal control of the driving motor and the like. Here, the error range of the first end position 31 may be set to a value in consideration of manufacturing tolerance and the like.

When it is determined that the valve member 16 is in the normal state in operation S4, the determination device 46 may determine whether or not the valve member 16 is stuck on the basis of a current level monitored by the current detector 45 and the controller 47 in operation S5.

In detail, in the determination as to whether or not the valve member 16 is stuck, which is made using the current detector 45, when a load is applied to the driving motor of the driving device 17 in the middle of rotating the valve member 16 toward the first end position 31, that is, before the valve member 16 reaches the first end position 31 (in other words, when the load is applied due to other factors rather than the stopper structure), the current level monitored in real time by the current detector 45 and the controller 47 may be increased. Here, when the determination device 46 recognizes that the current level is increased, the determination device 46 may determine that the valve member 16 is stuck. In addition, when the determination device 46 recognizes that the current level is not increased, the determination device 46 may determine that the valve member 16 is in a normal state.

When the determination device 46 determines that the valve member 16 is in the normal state (the valve member 16 is not stuck) in operation S5, the valve member 16 may be rotated by the controller 47 and the driving device 17 in the reverse direction, and the valve member 16 may be moved to the second end position 32 in operation S6. Here, the controller 47 may control the driving device 17 to move the valve member 16 to the second end position 32. For example, the second end position 32 may be 180° in FIG. 7.

When the valve member 16 is stopped in a particular position in the middle of moving toward the second end position 32, the determination device 46 may compare a position of the valve member 16 sensed by the second position sensor 42 with the second end position 32 to determine whether or not the valve member 16 is stuck in operation S7.

In detail, in the determination as to whether or not the valve member 16 is stuck, which is made using the second position sensor 42, when the position of the valve member 16 sensed by the second position sensor 42 is within an error range of the second end position 32, the determination device 46 may determine that the valve member 16 is in a normal state (the valve member 16 is not stuck). On the other hand, when the position of the valve member 16 sensed by the second position sensor 42 is out of the error range of the second end position 32, the determination device 46 may determine that the valve member 16 is stuck due to errors in sensor signals and the control circuit, abnormal control of the driving motor and the like. Here, the error range of the second end position 32 may be set to a value in consideration of manufacturing tolerances or other consideration.

When the determination device 46 determines that the valve member 16 is in the normal state (the valve member 16 is not stuck), the determination device 46 may determine whether or not a current level monitored by the current detector 45 and the controller 47 is within a normal range in operation S8.

In detail, in the determination as to whether or not the valve member 16 is stuck, which is made using the current detector 45, when a load is applied to the driving motor of the driving device 17 in the middle of rotating the valve member 16 toward the second end position 32, that is, before the valve member 16 reaches the second end position 32 (in other words, when the load is applied due to other factors rather than the stopper structure), the current level monitored in real time by the current detector 45 and the controller 47 may be increased. Here, when the determination device 46 recognizes that the monitored current level is increased, the determination device 46 may determine that the valve member 16 is stuck. In addition, when the determination device 46 recognizes that the monitored current level is not increased, the determination device 46 may determine that the valve member 16 is in a normal state (the valve member 16 is not stuck).

When the determination device 46 determines that the valve member 16 is in the normal state in operation S8, the valve member 16 may be rotated in the reverse direction to be moved to a position in which the first outflow port 11 is closed. Then, the coolant control valve 10 may be normally controlled depending on a temperature condition of the engine 1, conditions in the interior of the vehicle and the like, in operation S9.

When it is determined that the valve member 16 is stuck in at least one of operations S4, S5, S7 and S8, the controller 47 may control the driving device 17 to move the valve member 16 to a limp home position, and it may be determined whether or not the valve member 16 is moved to the limp home position in operation S10. Here, the limp home position refers to a position in which the first outflow port 11 is opened. Thus, the coolant may be circulated to the radiator 3, whereby overheating of the coolant may be prevented.

Then, when the valve member 16 is moved to the limp home position, a warning signal may be generated, and a limp home mode may be driven in operation S11.

Unless the valve member 16 is moved to the limp home position in operation S10, a stuck release operation may be performed to release the valve member 16 that has been stuck in operation S12. Here, the controller 47 may control the driving device 17 to rotate the valve member 16 in any one direction, thereby trying to release the valve member 16 that has been stuck.

When the valve member 16 is released through the stuck release operation in operation S12, operation S4 may be performed again to determine whether or not the valve member 16 is stuck.

Unless the valve member 16 is released through the stuck release operation in operation S12, a warning signal may be generated by turning on a warning light in a display screen of the cluster 49 of the vehicle, and a warning message for guiding a switching operation of the emergency switch device 50 may be transmitted to the display screen of the cluster 49 in operation S13.

Then, a change in temperature of the coolant may be monitored in real time to determine whether or not the temperature of the coolant is lowered in operation S14. When the temperature of the coolant is lowered, a limited operation may be continuously maintained in operation S15. Unless the temperature of the coolant is changed, the engine may be stopped, and then, the switching valve 53 of the emergency switch device 50 may perform the switching operation to allow the coolant to flow toward the radiator 3 in operation S16.

As set forth above, the diagnostic apparatus and method may diagnose a failure of the coolant control valve, such as a valve stuck, using control logic, to thereby warn the vehicle operator of the failure and secure driving stability.

In particular, the failure of the coolant control valve may be diagnosed through the control logic immediately after the vehicle engine is started, and thus, a possibility of engine failure due to overheating and the like while driving may be low. Accordingly, a thermostat that is only used in a section of the cold start of the engine may be omitted, and thus, the structure of the coolant control valve may be simplified, and manufacturing costs may be significantly reduced.

In addition, even in a state in which the coolant control valve is stuck, the flow of the coolant may be enabled by the emergency switch device, whereby overheating of the engine may be prevented.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A diagnostic apparatus for a coolant control valve including a housing having a plurality of ports, a valve member provided to be rotatable in the housing, and a driving device rotating the valve member between two end positions, the diagnostic apparatus comprising:
   at least one position sensor provided on an external surface of the housing for sensing a position of the valve member;
   a determination device for determining whether or not the valve member is stuck using the position of the valve member sensed by the position sensor;
   a controller for controlling the driving device, and
   an emergency switch device for allowing a coolant to flow toward a radiator when the valve member is stuck.

2. The diagnostic apparatus according to claim 1, wherein the determination device compares the position of the valve member sensed by the position sensor with the end positions to determine whether or not the valve member is stuck.

3. The diagnostic apparatus according to claim 1, further comprising a current detector for monitoring a current level of the driving device in real time,
   wherein the determination device determines whether or not the valve member is stuck using the current level monitored in real time by the current detector.

4. The diagnostic apparatus according to claim 1, wherein the controller is connected to a warning device for warning that the valve member is stuck.

5. The diagnostic apparatus according to claim 1, wherein the housing of the coolant control valve has an inflow port connected to a cooling jacket of an engine through an inflow passage, a first outflow port connected to the radiator through a first outflow passage and a second outflow port connected to a heater through a second outflow passage, and
   the emergency switch device includes a bypass passage connecting the inflow passage to the first outflow passage, and a switching valve provided in the bypass passage to allow the coolant to flow toward the radiator.

6. The diagnostic apparatus according to claim 1, wherein the housing of the coolant control valve has an inflow port connected to a cooling jacket of an engine through an inflow passage, a first outflow port connected to the radiator through a first outflow passage and a second outflow port connected to a heater through a second outflow passage, and
   the emergency switch device includes a first bypass passage connecting the inflow passage to the first outflow passage, a second bypass passage connecting the inflow passage to the second outflow passage and a switching valve that is switched to allow the coolant to flow through any one of the first bypass passage and the second bypass passage.

7. A diagnostic method for a coolant control valve including a housing having an inflow port connected to a cooling jacket of an engine and a first outflow port connected to a radiator, a valve member provided to be rotatable in the housing, and a driving device for rotating the valve member between two end positions, the diagnostic method comprising:

rotating the valve member to fully open the first outflow port when the engine is off;

moving the valve member to at least one of the end positions when the engine is on to perform a determination operation that determines whether or not the valve member is stuck; and moving the valve member to a limp home position when it is determined that the valve member is stuck, to operate a limp home mode and generate a warning signal.

8. The diagnostic method according to claim 7, further comprising performing a stuck release operation of the valve member unless the valve member is moved to the limp home position.

9. The diagnostic method according to claim 8, further comprising:

determining whether or not the valve member is stuck again when the valve member is released through the stuck release operation; and generating a warning signal again unless the valve member is released through the stuck release operation.

10. The diagnostic method according to claim 7, further comprising normally controlling the coolant control valve after moving the valve member to a position in which the first outflow port is closed when it is determined that the valve member is in a normal state.

11. The diagnostic method according to claim 7, wherein the determination operation comprises:

a first determination operation including rotating the valve member toward a first end position and determining whether or not a position of the valve member sensed by a position sensor is within an error range of the first end position; and a second determination operation including rotating the valve member toward a second end position when it is determined in the first determination operation that the valve member is stuck and determining whether or not a position of the valve member sensed by a position sensor is within an error range of the second end position.

12. The diagnostic method according to claim 11, wherein the first determination operation further includes determining whether or not the valve member is stuck on the basis of a current level monitored in real time in the middle of moving the valve member to the first end position.

13. The diagnostic method according to claim 11, wherein the second determination operation further includes determining whether or not the valve member is stuck on the basis of a current level monitored in real time in the middle of moving the valve member to the second end position.

* * * * *